(12) United States Patent
Steiner et al.

(10) Patent No.: US 10,438,113 B2
(45) Date of Patent: Oct. 8, 2019

(54) HIERARCHICAL DEVICE PLACEMENT WITH REINFORCEMENT LEARNING

(71) Applicant: Google LLC, Mountain View, CA (US)

(72) Inventors: Benoit Steiner, Mountain View, CA (US); Anna Darling Goldie, Mountain View, CA (US); Jeffrey Adgate Dean, Palo Alto, CA (US); Hieu Hy Pham, Menlo Park, CA (US); Azalia Mirhoseini, San Jose, CA (US); Quoc V. Le, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/040,186

(22) Filed: Jul. 19, 2018

(65) Prior Publication Data

US 2019/0026624 A1    Jan. 24, 2019

Related U.S. Application Data

(60) Provisional application No. 62/535,790, filed on Jul. 21, 2017.

(51) Int. Cl.
*G06N 3/04* (2006.01)
*G06N 20/00* (2019.01)
(Continued)

(52) U.S. Cl.
CPC ......... *G06N 3/0454* (2013.01); *G06F 9/5066* (2013.01); *G06F 16/9024* (2019.01);
(Continued)

(58) Field of Classification Search
None
See application file for complete search history.

(56) References Cited

U.S. PATENT DOCUMENTS

2017/0351530 A1* 12/2017 Gupta ................... G06F 9/4405
2018/0247197 A1*  8/2018 Tucker .................. G06F 9/5038

OTHER PUBLICATIONS

Mao et al., Resource Management with Deep Reinforcement Learning, ACM, 2016, pp. 50-56 (Year: 2016).*

(Continued)

*Primary Examiner* — Alan Chen
(74) *Attorney, Agent, or Firm* — Fish & Richardson P.C.

(57) ABSTRACT

A method for determining a placement for machine learning model operations across multiple hardware devices includes receiving data specifying machine learning operations, and determining a placement that assigns each of the operations specified by the data to a respective device from the multiple hardware devices. Determining the placement includes: generating, from the data, a respective operation embedding for each of the operations; grouping the operations into multiple operation groups, comprising processing each of the respective operation embeddings using a grouper neural network having multiple grouper parameters, in which the grouper neural network is configured to, for each of the operations, process the operation embedding for the operation in accordance with first values of the grouper parameters to generate a grouper output that assigns the operation to an operation group from the multiple operation groups; and assigning each of the operation groups to a respective device from the multiple hardware devices.

19 Claims, 4 Drawing Sheets

(51) Int. Cl.
*G06F 16/901* (2019.01)
*G06N 3/063* (2006.01)
*G06N 3/08* (2006.01)
*G06N 5/04* (2006.01)
*G06F 9/50* (2006.01)

(52) U.S. Cl.
CPC ........... *G06N 3/0445* (2013.01); *G06N 3/063* (2013.01); *G06N 3/084* (2013.01); *G06N 5/045* (2013.01); *G06N 20/00* (2019.01)

(56) References Cited

OTHER PUBLICATIONS

Abadi et al. "Tensorflow: A system for large-scale machine learning," OSDI, Nov. 2, 2016, 21 pages.
Bahdanau et al. "Neural Machine Translation by jointly learning to align and translation," arXiv 14090473v7, May 19, 2016, 15 pages.
Barnard et al. "A fast multilevel implementation of recursive spectral bisection for partitioning unstructured problems," Concurrency: practice and Experience, 6(2), Apr. 1994, 20 pages.
Bello et al. "Neural combinatorial optimization with reinforcement learning," arXiv 1611.09940v3, Jan. 12, 2017, 15 pages.
Chevalier et al. "Improvement of the efficiency of genetic algorithms for scalable parallel graph partitioning in a multi-level framework," Sep. 2006, 11 pages.
Deng et al. "ImageNet: A large-scale hierarchical image database," IEEE Conference on Computer Vision and Pattern Recognition, Jun. 2009, 8 pages.
Hannun et al. "Deep speech: Scaling up end-to-end speech recognition," arXiv 1412.5567v2, Dec. 19, 2014, 12 pages.
He et al. "Deep residual learning for image recognition," IEEE Conference on Computer Vision and Pattern Recognition, Jun. 2016, 9 pages.
Hinton et al. "Deep neural networks for acoustic modeling in speech recognition: The shared views of four research groups," IEEE Signal Processing Magazine, Nov. 2012, 16 pages.
Hochreiter et al. "Long short-term memory," Neural computation, Nov. 1997, 32 pages.
Jozefowicz et al. "Exploring the limits of language modeling," arXiv 1602.02410v2, Feb. 11, 2016, 11 pages.
Karypis "A fast and high quality multilevel scheme for partitioning irregular graphs," Technical Report 95-035, University of Minnesota, Jun. 1995, 28 pages.
Krypis et al. "Metis-unstructured graph partitioning and sparse matrix ordering system," Version 2.0, Aug. 26, 1995, 16 pages.

Khetan et al. "Achieving budget-optimality with adaptive schemes in crowdsourcing," Advances in Neural Information Processing Systems 29, Dec. 2016, 9 pages.
Kingma et la. "Adam: A method for stochastic optimization," arXiv 1412.6980v9, Jan. 30, 2017, 15 pages.
Krizhevsky et al. "Imagenet classification with deep convolutional neural networks," NIPS Dec. 2012, 9 pages.
LeCun et al. "Gradient-based learning applied to document recognition," Proceedings of the IEEE, Nov. 1998, 46 pages.
Mirhoseini et al. "Device placement optimization with reinforcement learning," International Conference on Machine Learning, Jun. 13, 2017, 11 pages.
Pellegrini et al. "Experimental analysis of the dual recursive bipartioning algorithm for static mapping," Research Report, Universite Bordeaux, Aug. 1996, 39 pages.
Pellegrini. "A parallelizable multi-level banded diffusion scheme for computing balances partitions with smooth boundaries," European Conference on Parallel Processing, Aug. 2007, 11 pages.
Pellegrini. "Distillating knowledge about scotch," Dagstuhl Seminar Proceedings, Jan. 2009, 12 pages.
Szegedy et al. "Going deeper with convolutions," IEEE Conference on Computer Vision and Patter Recognition, Jun. 2015, 9 pages.
Szegedy et al. "Inception-v4, inception-resnet and the impact of residual convention on learning," arXiv 1602.07261v2, Aug. 23, 2016, 12 pages.
Szegedy et al. "Rethinking the inception architecture for computer vision," IEEE Conference on Computer Vision and Pattern Recognition, Jun. 2016, 9 pages.
Sutskever et al. "Sequence to sequence learning with neural networks," NIPS Dec. 2014, 9 pages.
Taigman et al. "Deepface Closing the gap to human-level performance in face verification," IEEE Conference on Computer Vision and Pattern Recognition, Jun. 2014, 8 pages.
Vinyals et al. "Pointer networks," NIPS Dec. 2015, 9 pages.
Williams. "Simple statistical gradient-following algorithms for connectionist reinforcement learning," Machine Learning, May 1992, 28 pages.
Wu et al. "Google's neural machine translation system: Bridging the gap between human and machine translation," arXiv 1609.08144v2, Oct. 8, 2016, 23 pages.
Zaremba et al. "Recurrent neural network regularization," arXiv 1409.2329v5, Feb. 19, 2015, 8 pages.
Mirhoseini et al. "A Hierarchical Model for Device Placement," Submitted as a conference paper to ICLR, 2018 [retrieved on Oct. 5, 2018] Retrieved from Internet: URL<https://openreview.net/pdf?id=Hkc-TeZ0w> 11 pages.
PCT International Search Report and Written Opinion issued in International Application No. PCT/US2018/042377, dated Oct. 24, 2018, 17 pages.

\* cited by examiner

300

Process a current sequence of operation embeddings using the grouper neural network and the placer neural network in accordance with current values of the placer parameters and the grouper parameters to select one or more placements of the operations across the plurality of devices
302

For each selected placement: perform the operations across the plurality of devices according to the placement, and determine a time required for the processing to complete
304

Adjust the current values of the grouper parameters and the placer parameters using a reinforcement learning technique that uses a reward derived from the times required for the processing to complete for each of the selected placements
306

FIG. 3

HIERARCHICAL DEVICE PLACEMENT WITH REINFORCEMENT LEARNING

CROSS-REFERENCE TO RELATED APPLICATION

This application claims priority to U.S. Provisional Application Ser. No. 62/535,790, filed on Jul. 21, 2017. The disclosure of the prior application is considered part of and is incorporated by reference in the disclosure of this application.

BACKGROUND

This specification relates to determining a placement of computational graphs across multiple devices using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. An example of a recurrent neural network is a long short term (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

This specification describes a system implemented as computer programs on one or more computers in one or more locations that determines a placement for machine learning model operations across a plurality of hardware devices.

The subject matter described in this specification can be implemented in particular embodiments so as to realize one or more of the following advantages. By using a two-level hierarchical model that includes a grouper neural network that groups operations of a machine learning model and a placer neural network that places those groups on devices, the efficiency of performing the operations of the machine learning model using the devices is improved.

In particular, the use of the grouper neural network enables placements for machine learning operations that makes efficient use of hardware devices to be effectively determined in an end-to-end manner that requires no manual effort. That is, the placements can be determined without requiring users to first manually group the operations into operation groups as a pre-processing step.

Further, the grouper and placer neural network are trained jointly using reinforcement learning to optimize for speed of computation, i.e., by maximizing a reward derived from execution times. Therefore, the placements determined by the two neural networks can result in a decreased processing time for the machine learning model operations, i.e., allow the machine learning model to be trained quicker, machine learning model inferences to be generated quicker, or both, while using the same number of hardware devices to perform the operations. The training techniques further allow the neural networks to learn the properties of the current hardware environment including the complex tradeoff between computation and communication in hardware, allowing for the trained neural networks to generate better-performing placements that more efficiently utilize the available resources. That is, the system can effectively adapt the placement to the current hardware environment to account for the computational capacity of the devices in the environment and to minimize delays caused by communication between devices and maximize the performance of the operations.

In addition, as the operations are grouped before being placed, the two-level hierarchical model can effectively handle very large computational graphs and find non-trivial placements on multiple devices for machine learning models that have tens of thousands of operations.

While this specification describes placing machine learning operations, the techniques described in this specification can be used to place any collection of operations that can be described by a computational graph across a plurality of hardware devices.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 is a flow diagram of an example process for jointly training a grouper neural network and a placer neural network.

Like reference numbers and designations in the various drawings indicate like elements.

DETAILED DESCRIPTION

Figure 1:
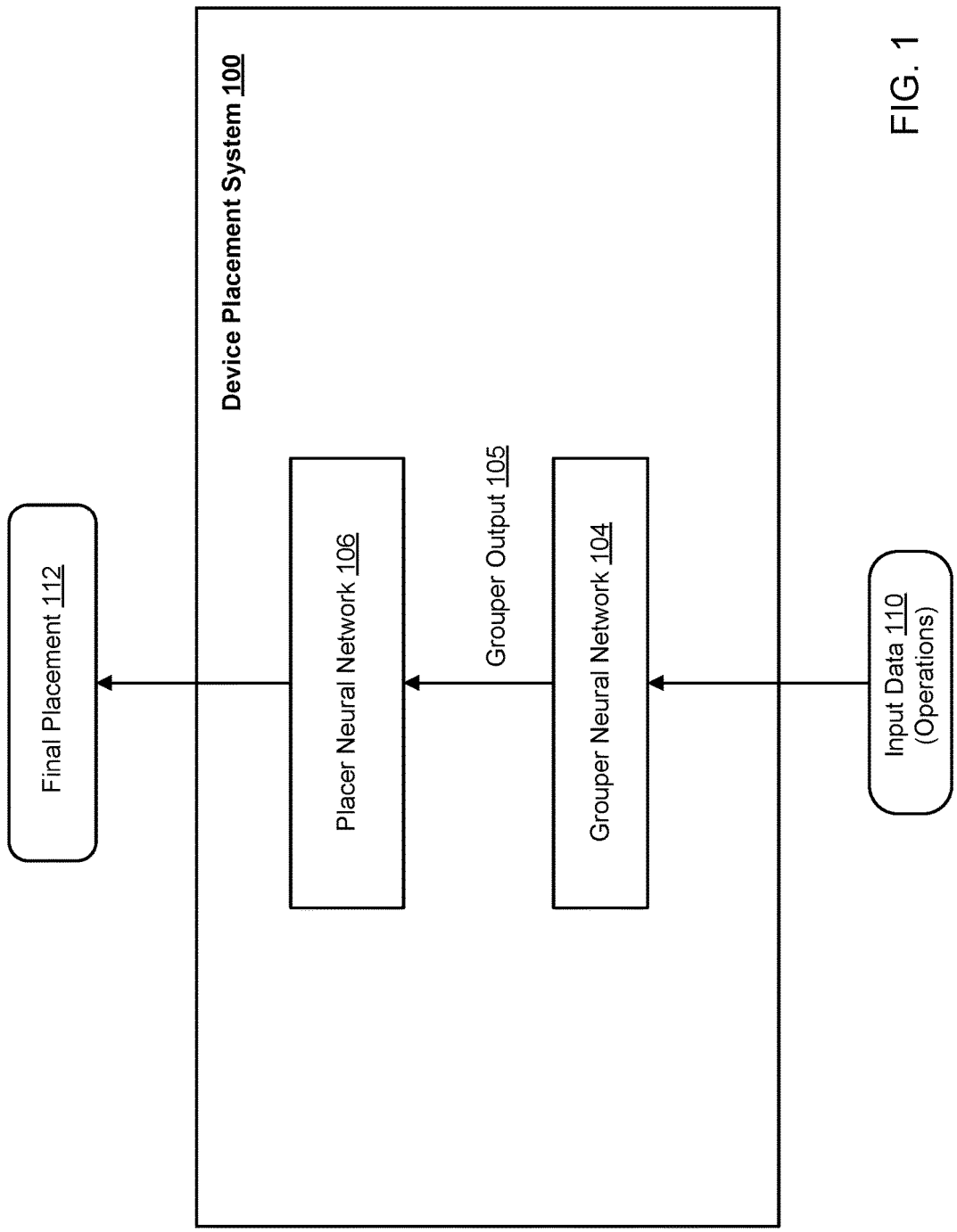
FIG. 1 shows an example device placement system that determines a placement for machine learning model operations.

FIG. 1 illustrates a device placement system 100 that determines a placement for operations of a machine learning model across a plurality of hardware devices. In some cases, the operations can be operations necessary for performing an inference using the machine learning model. In some other cases, the operations can be operations necessary for training the machine learning model. The device placement system 100 can be implemented as computer programs on one or more computers in one or more locations.

The machine learning model can be configured to receive any kind of digital data input and to generate any kind of score, classification, or regression output based on the input.

For example, if the inputs to the machine learning model are images or features that have been extracted from images, the output generated by the machine learning model for a given image may be scores for each of a set of object categories, with each score representing an estimated likelihood that the image contains an image of an object belonging to the category.

As another example, if the inputs to the machine learning model are Internet resources (e.g., web pages), documents, or portions of documents or features extracted from Internet resources, documents, or portions of documents, the output generated by the machine learning model for a given Internet resource, document, or portion of a document may be a score for each of a set of topics, with each score representing an estimated likelihood that the Internet resource, document, or document portion is about the topic.

As another example, if the inputs to the machine learning model are features of an impression context for a particular advertisement, the output generated by the machine learning model may be a score that represents an estimated likelihood that the particular advertisement will be clicked on.

As another example, if the inputs to the machine learning model are features of a personalized recommendation for a user, e.g., features characterizing the context for the recommendation, e.g., features characterizing previous actions taken by the user, the output generated by the machine learning model may be a score for each of a set of content items, with each score representing an estimated likelihood that the user will respond favorably to being recommended the content item.

As another example, if the input to the machine learning model is a sequence of text in one language, the output generated by the machine learning model may be a score for each of a set of pieces of text in another language, with each score representing an estimated likelihood that the piece of text in the other language is a proper translation of the input text into the other language.

As another example, if the input to the machine learning model is a sequence representing a spoken utterance, the output generated by the machine learning model may be a score for each of a set of pieces of text, each score representing an estimated likelihood that the piece of text is the correct transcript for the utterance.

In particular, the device placement system 100 receives input data 110 that specifies a machine learning model to be placed for distributed processing on the plurality of hardware devices. The hardware devices are generally heterogeneous, and can include any appropriate hardware device, e.g., a combination of any of, CPUs, GPUs, ASICs or other special-purpose hardware, FPGAs, and so on.

The input data 110 specifying the machine learning model may include data specifying a plurality of operations of the machine learning model, e.g., data specifying a computational graph that has vertices that represent operations and edges that represent data communicated between the operations.

For example, the input data 110 includes data that represents a computational graph G having vertices that represent M operations $\{o_1, o_2, \ldots o_M\}$. The M operations can be operations to train the machine learning model or operations to generate outputs from received inputs using the machine learning model once the machine learning model has already been trained. Given M operations, the device placement system 100 aims to determine a placement=$\{p_1, p_2, \ldots, p_M\}$. The placement P is an assignment of each operation $o_i \in G$ to a device $p_i$ that belongs to a set of D available hardware devices, i.e., $p_i \in \{1, \ldots, D\}$.

An example computational graph and an example placement of computational graph operations of the graph on multiple hardware devices are described in detail with reference to FIG. 4.

To determine a placement, the system 100 jointly trains (i) a grouper neural network 104 that groups the operations of the machine learning model into a plurality of operation groups, and (ii) a placer neural network 106 that generates a placer output that assigns each of the plurality of operation groups to a respective hardware device from the plurality of hardware devices.

The grouper neural network 104 is a feedforward neural network. In particular, the grouper neural network 104 is a feed forward model that has a softmax neural network layer with an output size equal to the number of operation groups that the operations of the machine learning model are grouped into.

The placer neural network 106 is a recurrent neural network that includes a sequence-to-sequence model with recurrent neural network layers, e.g., Long Short-Term Memory (LSTM) neural network layers, and a content-based attention mechanism. An example sequence-to-sequence model is described in Sutskever et al. "Sequence to sequence learning with neural networks" in Neural Information Processing Systems, 2014. An example content-based attention mechanism is described in Bandanau, Dzmitry et al. "Neural machine translation by jointly learning to align and translate." In International Conference on Learning Representations, 2015.

Training of the grouper neural network 104 and the placer neural network 106 is described in more detail below with reference to FIG. 3.

Once the grouper neural network 104 and the placer neural network 106 have been trained, the system 100 can use the trained grouper neural network 104 and the trained placer neural network 106 to determine a placement that assigns each of the operations specified by the input data 110 to a respective device from the plurality of hardware devices.

In particular, the system 100 first generates, from the input data 100, a respective operation embedding for each of the plurality of operations.

Generally, for each of the plurality of operations, the system 100 generates a respective property embedding for each of a plurality of properties of the operation and combines the property embeddings to generate the operation embedding. The properties include one or more of an operation type of the operation, a size of outputs generated by the operation, or adjacency information for the operation (e.g., operations that provide input to and receive output generated by the operation).

For example, the system 100 can generate, for each of the plurality of operations, three vectors, each vector corresponding to a property: a vector that embeds an operation type of the operation (e.g., MatMul, Conv2d, or Sum), a vector that includes output sizes and number of outputs for the operation, and a vector that includes adjacency information for the operation. The output sizes and number of outputs for an operation can be referred to as "output shapes" of the operation. The system 100 can combine the three vectors to generate the operation embedding for the operation.

The system 100 then groups the operations into a plurality of operation groups by processing each of the respective operation embeddings using the grouper neural network 104. The grouper neural network 104 has multiple grouper parameters. To group the operations, the grouper neural network 104 is configured to, for each of the operations, process the operation embedding for the operation in accordance with trained values of the grouper parameters of the grouper neural network 104 to generate a grouper output.

The grouper output for a given operation assigns the operation to an operation group from the plurality of operation groups.

The system 100 generates, for each of the operation groups, a respective group embedding by combining the operation embeddings for the operations in the operation group.

For example, each group embedding can be a concatenation of three components: a first vector including a count of each operation type in the operation group, a second vector that counts the total number of output shapes of all operations in the group, and a third vector that includes group adjacency information. For example, the size of the third vector is the number of operation groups. The $i^{th}$ value of the third vector can be set to 1 if there are edges to the $i^{th}$ group from any operations in the group and 0 otherwise.

The system 100 processes the respective group embeddings for the operation groups using the placer neural network 106. The placer neural network 105 has multiple placer parameters. The placer neural network 106 is configured to process the respective group embeddings in accordance with trained values of the placer parameters to generate a placer output (i.e., final placement 112) that assigns each operation group to a respective hardware device from the plurality of hardware devices.

The system 100 can determine the trained values of the grouper parameters and the placer parameters from initial values of the grouper parameters and placer parameters by repeatedly performing a training process that is described in detail below with reference to FIG. 3. In some cases, the initial values can be determined by pre-training the grouper neural network 104 and the placer neural network 106. The pre-training can use a different set of machine learning operations, a different plurality of hardware devices, or both. Thus, in these cases, the system 100 leverages knowledge gained from training the networks for use with other machine learning models, other sets of hardware devices, or both in training the network for use with the current machine learning model and the current set of hardware devices. In some other cases, the system 100 can initialize the initial values using a parameter initialization technique (e.g., random initialization).

Alternatively, instead of generating the final placement 112 after the training has been completed, the system 100 can use the placement generated during the training that resulted in the shortest running time as the final placement 112. That is, the system 100 can track the running times for the placements generated during the training of the networks, and, after training is completed, use the placement that has the shortest tracked running time as the final placement 112.

Once the final placement 112 for the input data 110 is determined, the system 100 can schedule the operations of the machine learning model for processing by the plurality of hardware devices, i.e., causing the operations of the machine learning model to be executed according to the final placement 112. In particular, for each operation group, the system 100 places the operations in the operation group on the hardware device to which the operation group was assigned. In some cases, the system 100 can provide data identifying the final placement 112 to another system that manages the execution of the machine learning model so that the other system can place the operations across the devices according to the final placement.

Figure 2:
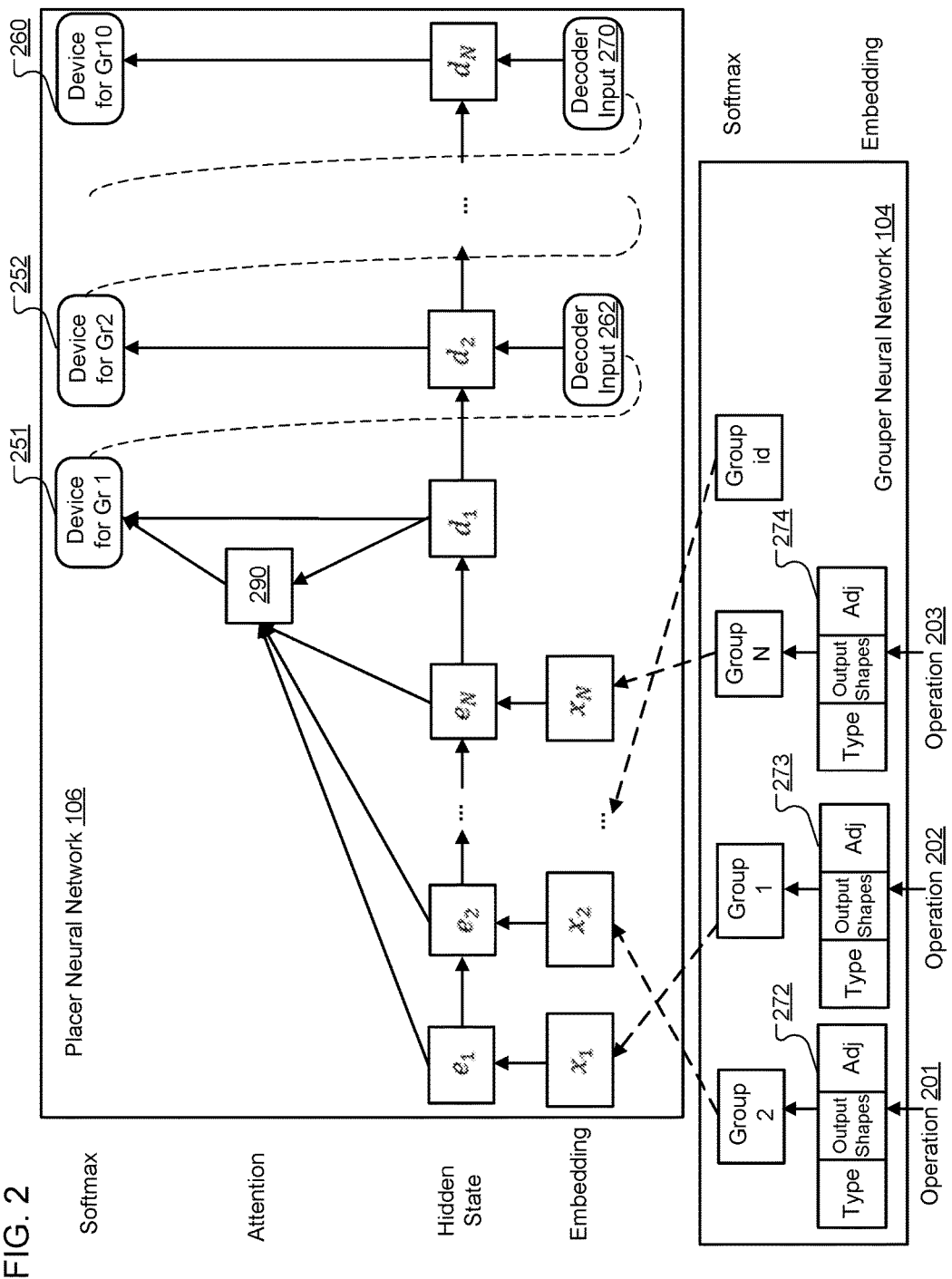
FIG. 2 shows an example architecture of a grouper neural network and a placer neural network.

FIG. 2 shows an example architecture of a grouper neural network 104 and a placer neural network 106.

The grouper neural network 104 is a feedforward neural network. In particular, the grouper neural network 104 includes one or more feed forward neural network layers followed by a softmax grouper neural network layer with an output size equal to the number of operation groups that operations of a machine learning model are grouped into.

The grouper neural network 104 is configured to receive, for each of a plurality of operations, a respective operation embedding (e.g., operation embeddings 272, 273, and 274 of operations 201, 202, and 203, respectively). Each of the operation embeddings include a respective property embedding for each of a plurality of properties of the operation and combines the property embeddings to generate the operation embedding. The properties include one or more of an operation type of the operation, a size of outputs generated by the operation, or operations that provide input to and receive output generated by the operation.

The grouper neural network 104 is configured to, for each of the plurality of operations, process the operation embedding for the operation in accordance with trained values of grouper parameters of the grouper neural network 104 to generate a grouper output. The grouper output assigns each operation to an operation group from a plurality of operation groups. For example, operation 201 is assigned to group 2, operation 202 is assigned to group 1, operation 203 is assigned to group N.

For each operation, the grouper neural network 104 may generate a set of group scores using the softmax grouper neural network layer. The set of group scores includes a respective group score for each operation group in the plurality of operation groups. The respective group score for each operation group represents how likely it is that the operation group is the best group to assign the operation characterized by the operation embedding. The grouper neural network 104 is then configured to select a group for each of the operations using the set of group scores for the operation embedding of the operation. In some cases, the grouper neural network 104 may select the group that has the highest score according to the set of scores for the operation embedding. In some other cases, the grouper neural network 104 may sample a group from the plurality of operation groups according to probabilities defined by the set of scores for the operation embedding characterizing the operation.

After the operations are grouped into the plurality of operation groups, a respective group embedding is generated for each of the operation groups by combining the operation embeddings for the operations in the operation group. The group embeddings are then provided as input to the placer neural network 106.

The placer neural network 106 is a recurrent neural network that includes a sequence-to-sequence model with Long Short-Term Memory (LSTM) neural network layers and a content-based attention mechanism.

The placer neural network 106 is configured to process the respective group embeddings of the operation groups in accordance with trained values of placer parameters to generate a placer output (i.e., a final placement) that assigns each operation group to a respective hardware device from a plurality of hardware devices.

In particular, given N operation groups, the placer neural network 106 receives N group embeddings $x_1, x_2, \ldots, x_N$ as input. The placer neural network 106 includes an encoder recurrent neural network that processes group embeddings one at a time and generates corresponding encoder hidden states $e_1, e_2, \ldots, e_N$. The placer neural network 106 further includes a decoder recurrent neural network that maintains LSTM hidden states $d_1, d_2, \ldots, d_N$. The decoder recurrent neural network is configured to output a device for a respective group embedding at each decoding time step. Each decoding time step corresponds to one group embedding. That is, the devices are outputted in the same order as the input group embeddings, i.e., the operations in the first operation group will be placed on the device outputted by the first decoding time step, and so on. Each device has its own embedding, which may be learned during the training process or fixed, which is then fed as a decoder input to the next decoding time step. For example, the trainable embedding of device 251, which is outputted by the first decoding step, is fed as a decoder input (i.e., decoder input 262) to the second decoding time step.

More specifically, at each decoding time step, the decoder recurrent neural network is configured to receive a decoder input and to process the decoder input and a set of appropriate encoder hidden states to generate a set of scores for the group embedding. The decoder neural network 294 may generate the set of device scores for the group embedding using a softmax placer neural network layer. The set of device scores for the group embedding includes a respective score for each hardware device in the plurality of hardware devices. The respective score for each hardware device represents how likely it is that the hardware device is the best device to assign the operation group characterized by the group embedding. The decoder recurrent neural network is then configured to select a device for each of the operation group using the set of scores for the group embedding. In some cases, the decoder recurrent neural network may select the device that has the highest score according to the set of scores for the group embedding. In some other cases, the decoder recurrent neural network may sample a device from the plurality of devices according to probabilities defined by the set of scores for the group embedding characterizing the operation group.

The decoder recurrent neural network can use an attention mechanism to attend over the encoder hidden states to determine a set of appropriate encoder hidden states (from the complete set of encoder hidden states for all of the operation groups) to be used at each decoding time step (e.g., the system determines a set of encoder hidden states 290 to be used at the first encoding time step). An example of an attention mechanism is described in Oriol Vinyals, Meire Fortunato, and Navdeep Jaitly. "Pointer networks." In NIPS, 2015.

FIG. 3 is a flow diagram of an example process for jointly training a grouper neural network and a placer neural network (e.g., for determining trained values of the grouper parameters and placer parameters). For convenience, the process 300 will be described as being performed by a system of one or more computers located in one or more locations. For example, a device placement system, e.g., the device placement system 100 of FIG. 1, appropriately programmed in accordance with this specification, can perform the process 300.

Generally, given a plurality of machine learning operations that are necessary to perform the processing (or training) of a machine learning model on a plurality of hardware devices, it is desirable for the trained grouper neural network and placer neural networks to determine a placement that requires a minimal time to perform the processing of the machine learning model under the placement.

To determine the trained values of grouper parameters and placer parameters, the system updates values of grouper parameters and placer parameters from initial values of grouper parameters and placer parameters by repeatedly performing the following steps 302-306. In some cases, the initial values can be determined by pre-training the grouper neural network and the placer neural network. In some other cases, the system can initialize the initial values using a parameter initialization technique (e.g., random initialization).

The system processes a current sequence of operation embeddings using the grouper neural network and the placer neural network in accordance with current values of the placer parameters and the grouper parameters to select one or more placements (e.g., Z placements) the operations across the plurality of devices (step 302).

For example, to select Z placements, the system can run the grouper neural network m times to draw m sample group assignments from a probability distribution of group assignments defined by the grouper neural network. That is, the system provides a batch of m identical input examples to the grouper neural network. Each input example in the batch is the same current sequence of operation embeddings. For each input examples in the batch, the grouper neural network is configured to process the current sequence of operation embeddings to generate a group assignment that assigns operations to groups in accordance with a probability distribution defined by the grouper neural network (i.e., defined by a softmax grouper neural network layer of the grouper neural network) in the manner as described in detail above with reference to FIG. 2.

For each of the m group placements, the system runs the placer neural network k times to draw k sample placements from a probability distribution of placements defined by the placer neural network (e.g., defined by a softmax placer neural network layer of the placer neural network). The system obtains Z placements (that equals to k×m assignments) after running the placer neural network k times for each of the m group placement.

The system performs step 304 for each of the selected Z placements. In particular, the system performs the operations of the machine learning model across the plurality of devices according to the placement, and then determines a time required for the processing to complete. That is, for each selected placement, the system can monitor the processing of the machine learning model with the operations placed according to the selected placement and identify the time required for the processing to complete.

The system adjusts the current values of the grouper parameters and the placer parameters using a reinforcement learning technique that uses a reward derived from the times required for the processing to complete for each of the selected placements (step 306). Generally, the reward is higher when the running time is shorter to encourage the placement neural network to generate placements that have shorter running times.

For example, let $r_d$ denote the running time that it takes to perform a complete execution of operations of a machine learning model under a placement d. A reward $R_d$ for the placement d can be defined as a function of $r_d$. For instance, the reward can be defined as $R_d = -\text{sqrt}(r_d)$.

The system trains the grouper neural network and the placer neural network to maximize an objective function that is an expectation of $R_d$ given the selected Z placements:

$$J(\theta_g, \theta_d) = E_{P(d;\theta_g,\theta_d)}[R_d] = \sum_{g \sim \pi_g} \sum_{d \sim \pi_d} p(g; \theta_g) p(d | g; \theta_d) R_d \quad (1)$$

where $\theta_g$, $\theta_d$ denote the grouper parameters and placer parameters, respectively; $p(g,\theta_g)$ denotes a probability of a sample group assignment g drawn from the grouper softmax distribution~$\pi_g$; $p(d;\theta_d)$ is the probability of a sample device placement d draw from the placer softmax distribution~$\pi_d$.

The system determines a gradient of the objective function using a reinforcement learning technique, e.g., a REINFORCE technique. Using a REINFORCE technique, the gradient of the objective function can be derived (w.r.t. $\theta_g$ and $\theta_d$) as follows:

$$\nabla_{\theta_g} J(\theta_g, \theta_d) = \sum_{g \sim \pi_g} \nabla_{\theta_g} p(g; \theta_g) \sum_{d \sim \pi_d} p(d \mid g; \theta_d) R_d \qquad (2)$$

$$\approx \frac{1}{m} \sum_{g_i \sim \pi_g}^{1 \le i \le m} \nabla_{\theta_g} \log p(g_i; \theta_g) \cdot \frac{1}{k}\left(\sum_{d_j \sim \pi_d}^{1 \le j \le k} R_{d_j}\right)$$

$$\nabla_{\theta_d} J(\theta_g, \theta_d) = \sum_{d \sim \pi_d} \sum_{g \sim \pi_g} p(g; \theta_g) \nabla_{\theta_d} p(d \mid g; \theta_d) R_d \qquad (3)$$

$$\approx \frac{1}{k} \sum_{d_j \sim \pi_d}^{1 \le j \le k} \frac{1}{m}\left(\sum_{g_i \sim \pi_g}^{1 \le i \le m} \nabla_{\theta_d} \log p(d_j \mid g_i; \theta_d) R_{d_j}\right)$$

where m is the number of group assignments drawn from the grouper softmax distribution and k is the number of placements drawn from the placer softmax distribution for each of the m group assignments.

To reduce the variance of the gradient, the system can use a reinforcement learning technique that includes a baseline term B, which is derived from a moving average of the required running times, to approximate the gradient. That is, the system can add the baseline term B to each of the gradients (2) and (3) above.

The system can determine the gradient of the objective function with respect to each of the grouper and placer parameters by backpropagation and then determine a respective updated value for each of the grouper and placer parameters using the backpropagated gradients, e.g., by applying a learning rate to the gradients and then adding the result to the current values of the grouper and placer parameters.

While adjusting the current values of the grouper and placer parameters, the system can optionally adjust the operation embeddings in the current sequence as part of the reinforcement learning technique, i.e., by backpropagating gradients into the operation embeddings.

Figure 4:
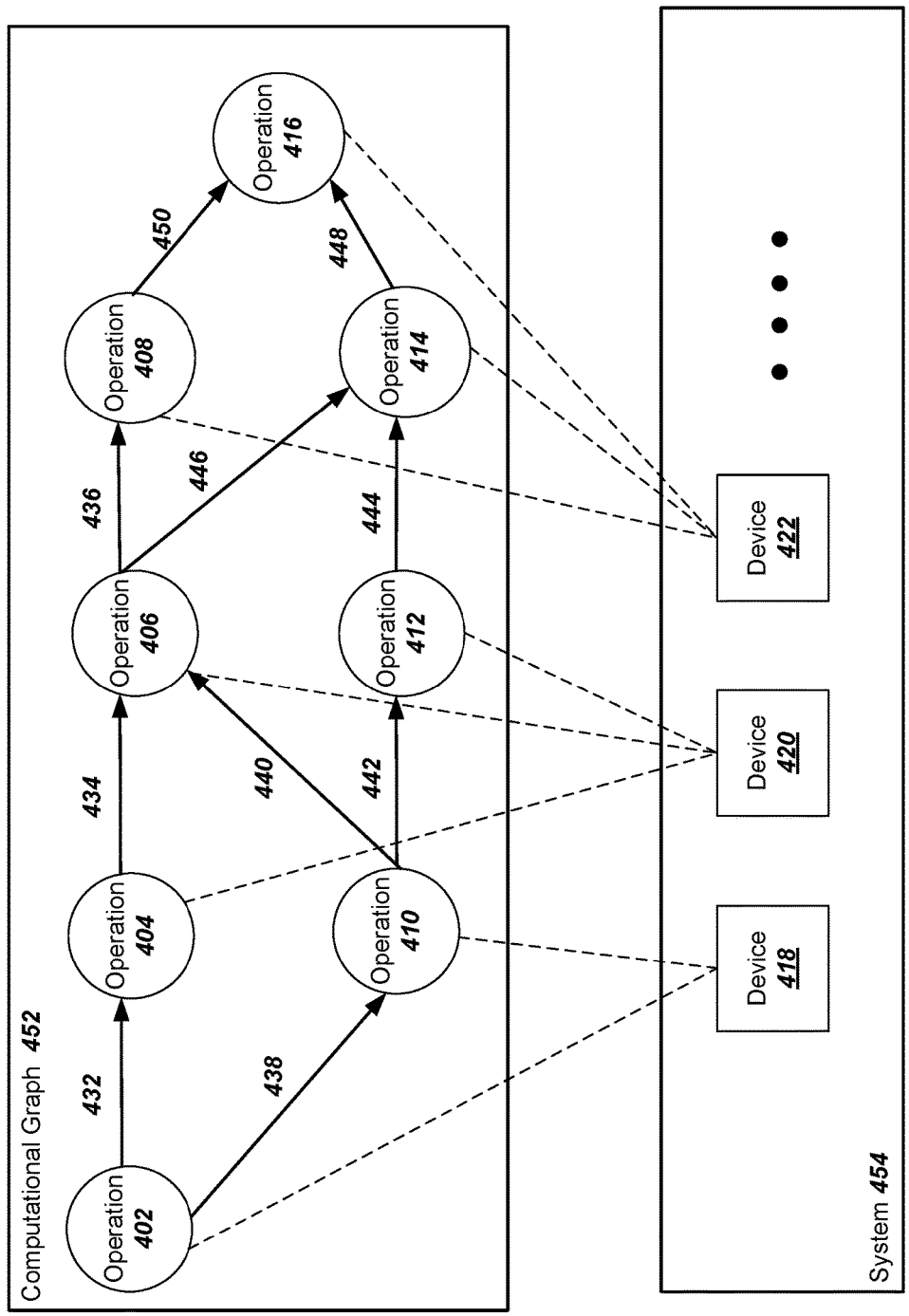
FIG. 4 illustrates an example computational graph and an example placement of computational graph operations of the graph on multiple devices.

FIG. 4 illustrates an example computational graph 452 and an example placement of computational graph operations of the graph 452 on multiple devices of a system 454. The computational graph 450 includes vertices that represent operations 402-416. The computational graph 450 further includes edges 432-450 that represent data communicated between the operations 402-406. For example, the computational graph 450 can be a TensorFlow computational graph whose vertices represent operations and edges represent multidimensional data arrays (tensors) communicated between the operations.

Each of the operations 402-416 can be assigned to one of the devices 418-422 of the system 454 according to a particular placement, e.g., a final placement determined by a device placement system (e.g., the device placement system 100 of FIG. 1) using a grouper neural network and a placer neural network (e.g., the grouper neural network 104 and the placer neural network 106 of FIG. 1). FIG. 4 shows an example final placement in which operation 402 and 410 belong to a first operation group that is assigned to device 418, operations 404, 406, and 412 belong to a second operation group that is assigned to device 420, and operations 408, 414, and 416 belong to a third operation group that is assigned to device 422.

The devices 418-422 are generally heterogeneous, and can include any appropriate hardware devices, e.g., a combination of any of, CPUs, GPUs, ASICs or other special-purpose hardware, FPGAs, and so on. For example, in some implementations, the system 454 can be a single machine with one or more CPUs and one or more GPUs and each of the operations 402-416 can be assigned to one of the CPUs and GPUs according to the particular placement. In some other implementations, the system 454 can include multiple machines with a mix of GPUs and ASICs or FPGAs and each of the operations 402-416 can be assigned to a device of one of the machines according to the particular placement.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
receiving data specifying machine learning operations that are to be distributed across a plurality of hardware devices for processing; and
determining a placement that assigns each of the operations specified by the received data to a respective device from the plurality of hardware devices, comprising:
generating, from the data specifying the operations, a respective operation embedding for each of the plurality of operations;
grouping the operations into a plurality of operation groups, comprising processing each of the respective operation embeddings using a grouper neural network having a plurality of grouper parameters,
wherein the grouper neural network is configured to, for each of the operations, process the operation embedding for the operation in accordance with first values of the grouper parameters to generate a grouper output that assigns the operation to an operation group from the plurality of operation groups; and
assigning each of the operation groups to a respective device from the plurality of hardware devices, comprising:
generating, for each of the operation groups, a respective group embedding by combining the operation embeddings for the operations in the operation group, and
processing the respective group embeddings for the operation groups using a placer neural network having a plurality of placer parameters,
wherein the placer neural network is configured to process the respective group embeddings in accordance with first values of the placer parameters to generate a placer output that assigns each operation group to a respective hardware device from the plurality of hardware devices.

2. The method of claim 1, further comprising:
scheduling the operations for processing by the plurality of hardware devices by, for each operation group, placing the operations in the operation group on the hardware device to which the operation group was assigned.

3. The method of claim 1, wherein the operations are operations necessary to train a machine learning model.

4. The method of claim 1, wherein the operations are operations necessary to perform an inference using a machine learning model.

5. The method of claim 1, wherein the data specifying the operations is data representing a computational graph having vertices that represent operations and edges that represent data communicated between the operations.

6. The method of claim 1, wherein the grouper neural network is a feedforward neural network.

7. The method of claim 1, wherein the placer neural network is a recurrent neural network.

8. The method of claim 7, wherein the placer neural network is a sequence-to-sequence neural network.

9. The method of claim 1, wherein the placer neural network employs learnable embeddings for the plurality of hardware devices.

10. The method of claim 1, wherein generating, from the data specifying the operations, a respective operation embedding for each of the plurality of operations comprises:
generating a respective property embedding for each of a plurality of properties of the operation; and
combining the property embeddings to generate the operation embedding.

11. The method of claim 10, wherein the properties comprise one or more of: an operation type of the operation, a size of outputs generated by the operation, or operations that provide input to and receive output generated by the operation.

12. The method of claim 1, further comprising:
determining the first values of the grouper parameters and the placer parameters from initial values of the grouper parameters and placer parameters by repeatedly performing the following:
processing a current sequence of operation embeddings using the grouper neural network and the placer neural network in accordance with current values of the placer parameters and the grouper parameters to select one or more placements of the operations across the plurality of devices;
for each selected placement:
performing the operations across the plurality of devices according to the placement, and
determining a time required for the processing to complete;
adjusting the current values of the grouper parameters and the placer parameters using a reinforcement learning technique that uses a reward derived from the times required for the processing to complete for each of the selected placements.

13. The method of claim 12, wherein the reinforcement learning technique is a REINFORCE technique.

14. The method of claim 13, wherein the reinforcement learning technique includes a baseline that is derived from a moving average of the required times.

15. The method of claim 12, wherein the initial values have been determined by pre-training the grouper neural network and the placer neural network.

16. The method of claim 15, wherein the pre-training used a different set of machine learning operations, a different plurality of hardware devices, or both.

17. The method of claim 12, further comprising initializing the initial values of the grouper parameters and the placer parameters using a parameter initialization technique.

18. A system comprising one or more computers and one or more non-transitory computer-readable storage media storing instructions that, when executed by the one or more computers, cause the one or more computers to perform operations comprising:
  receiving data specifying machine learning operations that are to be distributed across a plurality of hardware devices for processing; and
  determining a placement that assigns each of the operations specified by the received data to a respective device from the plurality of hardware devices, comprising:
    generating, from the data specifying the operations, a respective operation embedding for each of the plurality of operations;
    grouping the operations into a plurality of operation groups, comprising processing each of the respective operation embeddings using a grouper neural network having a plurality of grouper parameters,
      wherein the grouper neural network is configured to, for each of the operations, process the operation embedding for the operation in accordance with first values of the grouper parameters to generate a grouper output that assigns the operation to an operation group from the plurality of operation groups; and
    assigning each of the operation groups to a respective device from the plurality of hardware devices, comprising:
      generating, for each of the operation groups, a respective group embedding by combining the operation embeddings for the operations in the operation group, and
      processing the respective group embeddings for the operation groups using a placer neural network having a plurality of placer parameters,
      wherein the placer neural network is configured to process the respective group embeddings in accordance with first values of the placer parameters to generate a placer output that assigns each operation group to a respective hardware device from the plurality of hardware devices.

19. One or more non-transitory computer-readable storage media storing instructions that, when executed by one or more computers, cause the one or more computers to perform operations comprising:
  receiving data specifying machine learning operations that are to be distributed across a plurality of hardware devices for processing; and
  determining a placement that assigns each of the operations specified by the received data to a respective device from the plurality of hardware devices, comprising:
    generating, from the data specifying the operations, a respective operation embedding for each of the plurality of operations;
    grouping the operations into a plurality of operation groups, comprising processing each of the respective operation embeddings using a grouper neural network having a plurality of grouper parameters,
      wherein the grouper neural network is configured to, for each of the operations, process the operation embedding for the operation in accordance with first values of the grouper parameters to generate a grouper output that assigns the operation to an operation group from the plurality of operation groups; and
    assigning each of the operation groups to a respective device from the plurality of hardware devices, comprising:
      generating, for each of the operation groups, a respective group embedding by combining the operation embeddings for the operations in the operation group, and
      processing the respective group embeddings for the operation groups using a placer neural network having a plurality of placer parameters,
      wherein the placer neural network is configured to process the respective group embeddings in accordance with first values of the placer parameters to generate a placer output that assigns each operation group to a respective hardware device from the plurality of hardware devices.

* * * * *